(12) United States Patent
Yoshioka et al.

(10) Patent No.: US 12,541,264 B2
(45) Date of Patent: Feb. 3, 2026

(54) INFORMATION PROCESSING APPARATUS, AND INFORMATION PROCESSING METHOD

(71) Applicant: SONY GROUP CORPORATION, Tokyo (JP)

(72) Inventors: Yasuhiro Yoshioka, Tokyo (JP); Nanako Kawakami, Tokyo (JP); Akihiro Takanashi, Tokyo (JP); Yoshinori Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/837,674

(22) PCT Filed: Feb. 2, 2023

(86) PCT No.: PCT/JP2023/003326
§ 371 (c)(1),
(2) Date: Aug. 12, 2024

(87) PCT Pub. No.: WO2023/157648
PCT Pub. Date: Aug. 24, 2023

(65) Prior Publication Data
US 2025/0147621 A1 May 8, 2025

(30) Foreign Application Priority Data
Feb. 18, 2022 (JP) ................. 2022-024051

(51) Int. Cl.
*G06F 3/041* (2006.01)
(52) U.S. Cl.
CPC ........ *G06F 3/04166* (2019.05); *G06F 3/0414* (2013.01)

(58) Field of Classification Search
None
See application file for complete search history.

(56) References Cited

U.S. PATENT DOCUMENTS

2007/0277123 A1* 11/2007 Shin .................... G06F 3/04883
715/863
2015/0160856 A1* 6/2015 Jang .................... G06F 3/04886
715/773

(Continued)

FOREIGN PATENT DOCUMENTS

JP 2013-161209 A 8/2013
JP 2016-179152 A 10/2016

(Continued)

OTHER PUBLICATIONS

International Search Report and Written Opinion of PCT Application No. PCT/JP2023/003326, issued on Apr. 25, 2023, 09 pages of ISRWO.

*Primary Examiner* — Krishna P Neupane
(74) *Attorney, Agent, or Firm* — CHIP LAW GROUP

(57) ABSTRACT

Provided is an information processing apparatus includes a saving unit that saves touch history information indicating a history of a touch operation performed by an operation body that performs the touch operation to a screen and a processing unit that executes processing based on the touch history information saved by the saving unit. The processing unit determines the type of a touch operation based on the touch history information saved by the saving unit. The processing unit displays touch information indicating that an operation body has given a touch in a different display mode in accordance with the determined type of a touch operation.

12 Claims, 13 Drawing Sheets

| Basic Mode(2) | | |
|---|---|---|
| USER OPERATION | EXAMPLE OF TOUCH INFORMATION | DESCRIPTION |
| SHOT PRESS | ● | BASIC FORM. WHEN SCREEN IS TAPPED, IMAGE FOR EXPRESSING SPECIAL EFFECT OF BLINKING TWICE SHORT IS DISPLAYED. USER CAN SELECT COLOR. SIZE CHANGES IN ACCORDANCE WITH PRESSURE OF TOUCH WITH SCREEN. |
| LONG PRESS | (shaded circle) | IMAGE FOR EXPRESSING SPECIAL EFFECT OF LIGHT IN CIRCLE BLINKING WHILE CONTRACTING IS DISPLAYED UNTIL FINGER IS RELEASED FROM SCREEN. |
| DOUBLE TAP | (circle with dot) | DISPLAY DOUBLE CIRCLE. |
| REPEATED TAP | ⊙↔⊙ | COLOR IS CHANGED BY THREE OR MORE TAPS. FURTHERMORE, COLOR OF CIRCLE IS CHANGED FOR EACH TAP. |
| SWIPE | (swipe shape) | DISPLAY COLOR IN PORTION WHERE TOUCH PRESSURE IS DETECTED. |

(56) References Cited

U.S. PATENT DOCUMENTS

| | | | | |
|---|---|---|---|---|
| 2015/0227246 A1* | 8/2015 | Ogawa | ............ | G06F 3/0416 |
| | | | | 345/174 |
| 2015/0355768 A1* | 12/2015 | Kuwahara | ......... | A63F 13/2145 |
| | | | | 345/157 |
| 2016/0259543 A1* | 9/2016 | Ishihara | ............ | G06F 3/04842 |
| 2017/0003772 A1* | 1/2017 | Kwon | ............ | G06F 3/0488 |

FOREIGN PATENT DOCUMENTS

| | | |
|---|---|---|
| JP | 2020-018690 A | 2/2020 |
| JP | 2020-099747 A | 7/2020 |
| JP | 2020-198105 A | 12/2020 |
| JP | 2022-000154 A | 1/2022 |

\* cited by examiner

FIG.6

Basic Mode(2)

| USER OPERATION | EXAMPLE OF TOUCH INFORMATION | DESCRIPTION |
|---|---|---|
| SHOT PRESS |  | BASIC FORM. WHEN SCREEN IS TAPPED, IMAGE FOR EXPRESSING SPECIAL EFFECT OF BLINKING TWICE SHORT IS DISPLAYED.<br>USER CAN SELECT COLOR. SIZE CHANGES IN ACCORDANCE WITH PRESSURE OF TOUCH WITH SCREEN. |
| LONG PRESS | 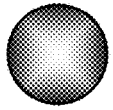 | IMAGE FOR EXPRESSING SPECIAL EFFECT OF LIGHT IN CIRCLE BLINKING WHILE CONTRACTING IS DISPLAYED UNTIL FINGER IS RELEASED FROM SCREEN. |
| DOUBLE TAP |  | DISPLAY DOUBLE CIRCLE. |
| REPEATED TAP | 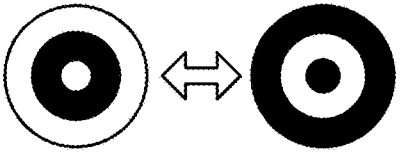 | COLOR IS CHANGED BY THREE OR MORE TAPS. FURTHERMORE, COLOR OF CIRCLE IS CHANGED FOR EACH TAP. |
| SWIPE |  | DISPLAY COLOR IN PORTION WHERE TOUCH PRESSURE IS DETECTED. |

FIG.7

Basic Mode(3)

| USER OP-ERATION | EXAMPLE OF TOUCH INFORMATION | DESCRIPTION |
|---|---|---|
| SHOT PRESS | ● ● ● ○ ⊙ | BASIC FORM. IMAGE FOR EXPRESSING SPECIAL EFFECT (HEREINAFTER, SHOT PRESS EFFECT) IS DISPLAYED. IN SHOT PRESS EFFECT, SMALL POINT GRADUALLY INCREASES IN SIZE. SMALL POINT CHANGES FROM POINT TO CIRCLE. SIZE AND THICKNESS OF CIRCLE GRADUALLY INCREASE. AFTER CHANGE, CIRCLE CHANGES TO HAVE SHAPE SURROUNDING POINT. USER CAN SELECT COLOR. |
| LONG PRESS | ● | IMAGE FOR EXPRESSING SPECIAL EFFECT OF LIGHT IN CIRCLE BLINKING WHILE CONTRACTING IS DISPLAYED UNTIL FINGER IS RELEASED FROM SCREEN. |
| DOUBLE TAP | ● ● ○ ⊙ (TWO ROUNDS) | SHOT PRESS EFFECT IS REPEATEDLY DISPLAYED TWICE. |
| REPEATED TAP | ● ● ○ ⊙ | DURING PRESS, SHOT PRESS EFFECT IS REPEATEDLY DISPLAYED THREE OR MORE TIMES. |
| SWIPE | ➚ | DISPLAY COLOR IN PORTION WHERE TOUCH PRESSURE IS DETECTED. |

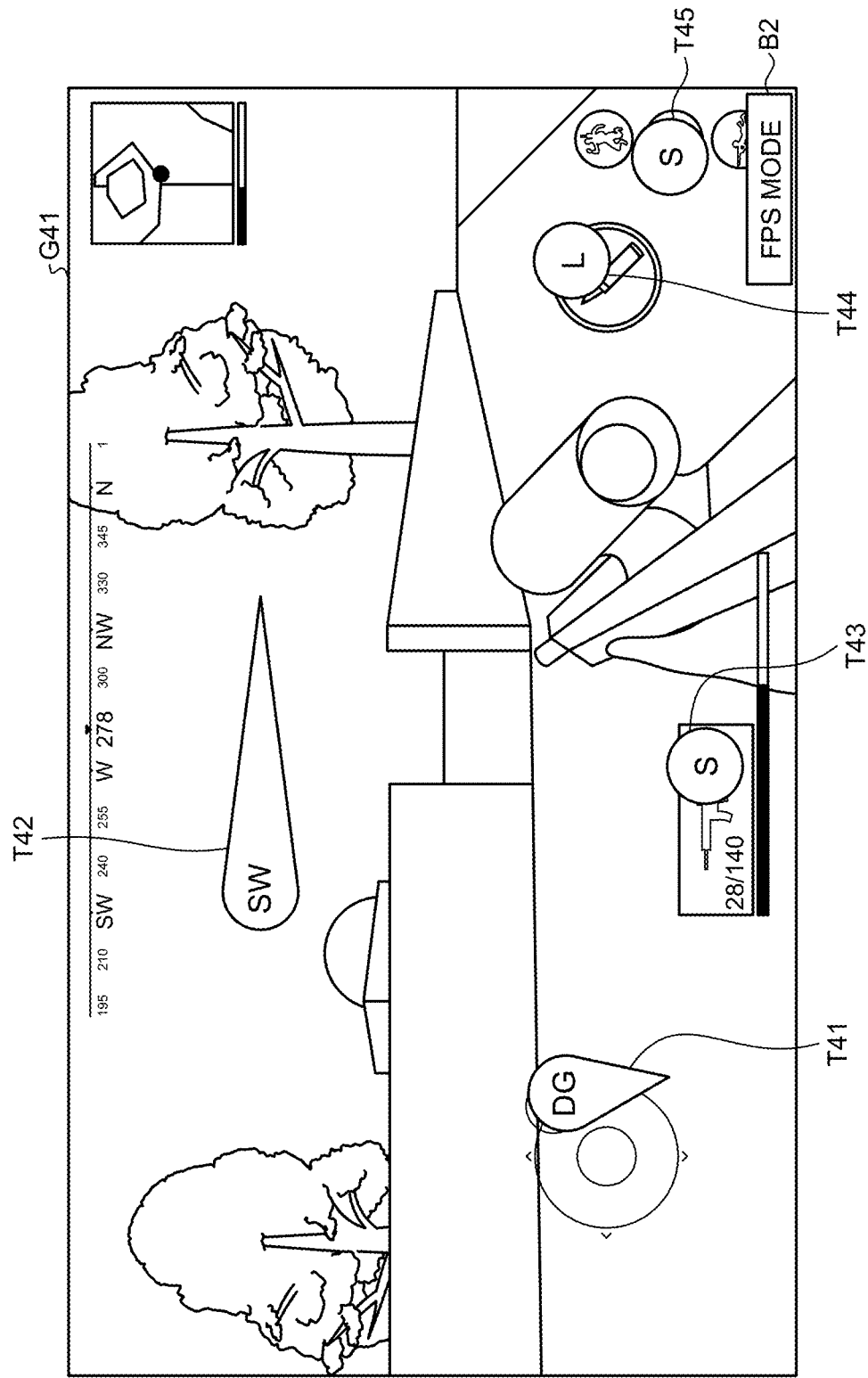

FIG.9

| FPS TRACK MODE | | |
|---|---|---|
| USER OPERATION | EXAMPLE OF TOUCH INFORMATION | DESCRIPTION |
| SHOT PRESS | (S) | Shot press |
| LONG PRESS | (L) | Long press |
| DOUBLE TAP | (DT) | Double Tap |
| REPEATED TAP | (RT) | Repeated Tap |
| SWIPE | (SW)▷ | SWipe |
| DRAG | (DG) | DraG |

INFORMATION PROCESSING APPARATUS, AND INFORMATION PROCESSING METHOD

CROSS REFERENCE TO RELATED APPLICATIONS

This application is a U.S. National Phase of International Patent Application No. PCT/JP2023/003326 filed on Feb. 2, 2023, which claims priority benefit of Japanese Patent Application No. JP 2022-024051 filed in the Japan Patent Office on Feb. 18, 2022. Each of the above-referenced applications is hereby incorporated herein by reference in its entirety.

FIELD

The present invention relates to an information processing apparatus, an information processing method, and an information processing program.

BACKGROUND

There has been known a technique of handling information on a touch operation to a screen. For example, there is known a technique of detecting a position of a touch of an operation body to a touch panel and selecting one of a plurality of objects based on the detected touch position and the previous touch position.

CITATION LIST

Patent Literature

Patent Literature 1: JP 2013-161209 A

SUMMARY

Technical Problem

In the above-described conventional technique, however, a position of a touch of an operation body to a touch panel is merely detected, and one of a plurality of objects is merely selected based on the detected touch position and the previous touch position. A touch operation to a screen cannot necessarily be reproduced. Thus, the present disclosure proposes an information processing apparatus, an information processing method, and an information processing program capable of reproducing a touch operation to a screen.

Solution to Problem

To solve the above problem, an information processing apparatus includes: a saving unit that saves touch history information indicating a history of a touch operation performed by an operation body that performs the touch operation to a screen; and a processing unit that executes processing based on the touch history information saved by the saving unit.

BRIEF DESCRIPTION OF DRAWINGS

FIG. 6 illustrates one example of the correspondence relation between each operation and touch information in a second basic mode according to the embodiment.

FIG. 7 illustrates one example of the correspondence relation between each operation and touch information in a third basic mode according to the embodiment.

FIG. 8 illustrates one example of a screen displaying a trajectory of each operation in a game screen of an FPS according to the embodiment.

FIG. 9 illustrates one example of the correspondence relation between each operation and touch information in an FPS track mode according to the embodiment.

DESCRIPTION OF EMBODIMENTS

An embodiment of the present disclosure will be described in detail below with reference to the drawings. Note that, in the following embodiment, the same reference signs are attached to the same parts to omit duplicate description.

EMBODIMENT

1. Introduction

Actions of distributing a video obtained by imaging a player playing a game (hereinafter, also referred to as game distributions) have been taken in video posting service and social networking service (SNS). Note that a distributor who distributes a video may be the same person as a player. For example, a distributor creates a commentary video for a one-hour game, posts the created commentary video to video posting service and SNS, and releases the created commentary video. Furthermore, for example, the distributor performs live distribution of the one-hour game. If only a game content screen (hereinafter, also referred to as game screen) is distributed in a case where such game distribution is performed, a viewer viewing the distributed video may have difficulty in understanding a game operation performed by the player just by viewing the game screen. In contrast, an information processing apparatus 100 according to an embodiment of the present disclosure distributes a game screen and a game operation history as a set. A game operation in the embodiment is performed by the player inputting a touch operation to a game screen displayed on a screen of a smartphone or the like with his/her finger or an operation body such as a touch pen. That is, the information processing apparatus 100 distributes a video in which information visualizing a history of touch operations performed by the player to the game screen is superimposed and displayed on the game screen. This enables the information processing apparatus 100 to distribute a video in which the viewer visually and easily understands a game operation performed by the player.

2. Configuration of Information Processing Apparatus

Figure 1:
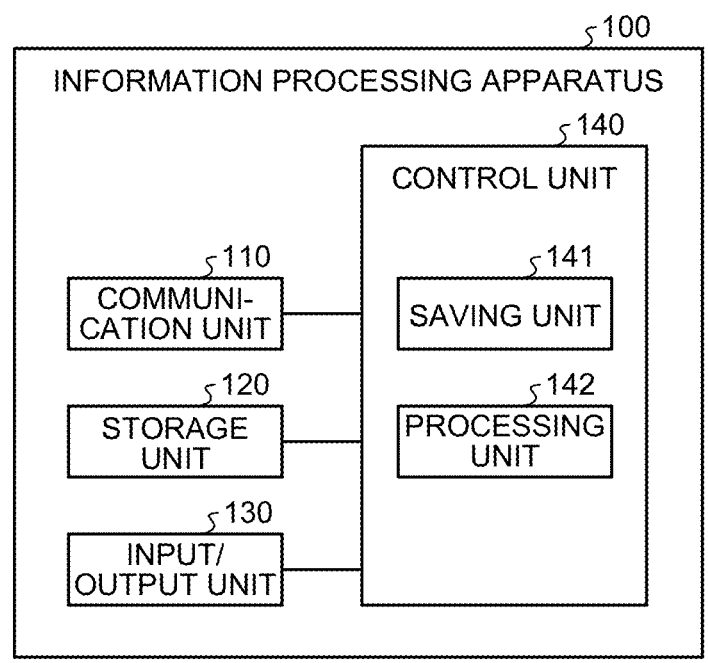
FIG. 1 illustrates a configuration example of an information processing apparatus according to an embodiment of the present disclosure.

FIG. 1 illustrates a configuration example of the information processing apparatus 100 according to the embodiment of the present disclosure. A user uses the information processing apparatus 100. The user performs a touch operation to a screen with his/her finger or an operation body such as a touch pen. A case will be described below in which a game screen is displayed on a screen of the information processing apparatus 100 and the user performs a touch operation to the game screen. As illustrated in FIG. 1, the information processing apparatus 100 includes a communication unit 110, a storage unit 120, an input/output unit 130, and a control unit 140.

The communication unit 110 is implemented by, for example, a network interface card (NIC). Then, the communication unit 110 may be connected to a network in a wired or wireless manner, and transmit and receive information to and from another information processing apparatus 100, for example.

The storage unit 120 is implemented by, for example, a semiconductor memory element, such as a random access memory (RAM) and a flash memory, or a storage device, such as a hard disk and an optical disk. For example, the storage unit 120 stores touch history information saved by a saving unit 141. Furthermore, the storage unit 120 stores information on a display mode of touch information.

The input/output unit 130 receives inputs of various operations from the user via the screen. The input/output unit 130 is implemented by, for example, a touch panel. The input/output unit 130 detects a touch of an operation body for performing a touch operation to the screen as a user operation, and provides the touch to the control unit 140 as an operation signal.

Furthermore, the input/output unit 130 displays various pieces of information under the control of the control unit 140. For example, the input/output unit 130 displays the game screen. Furthermore, the input/output unit 130 displays the touch history information indicating a history of touch operations performed by an operation body for performing a touch operation to the screen. A case where the input/output unit 130 is a touch panel and the operation body is a finger of the user will be described below.

The control unit 140 is a controller, and is implemented by, for example, a central processing unit (CPU), a micro processing unit (MPU), an application specific integrated circuit (ASIC), and a field programmable gate array (FPGA) executing various programs (corresponding to one example of information processing program) stored in a storage device inside the information processing apparatus 100 by using a storage area such as a RAM as a work area. In an example in FIG. 1, the control unit 140 includes the saving unit 141 and a processing unit 142.

The saving unit 141 saves the touch history information indicating a history of touch operations performed by an operation body for performing a touch operation to the screen. Specifically, the saving unit 141 acquires operation signals in time series from the input/output unit 130. Subsequently, the saving unit 141 generates pieces of position information indicating a touch position where the operation body has touched the screen in time series based on the acquired operation signals. For example, the saving unit 141 generates pieces of two-dimensional coordinate information indicating a touch position where the operation body has touched the screen in time series as pieces of position information. Subsequently, the saving unit 141 generates, as touch history information, information in which time point information is associated with the generated position information. The time point information indicates a touch time point when the operation body has touched each position of the screen. After generating the touch history information, the saving unit 141 saves the generated touch history information in the storage unit 120. As described above, the saving unit 141 saves, as pieces of touch history information, pieces of position information indicating a touch position where the operation body has touched the screen in time series.

Furthermore, the saving unit 141 generates time information indicating a touch time when the operation body has touched each position of the screen based on the acquired operation signals. For example, the saving unit 141 generates, as time information, the number of seconds (e.g., 0.1, 0.5, or 1 second) indicating the length of the touch time when the operation body has touched each position of the screen. Subsequently, the saving unit 141 generates, as touch history information, information in which the generated time information is associated with the position information. After generating the touch history information, the saving unit 141 saves the generated touch history information in the storage unit 120. As described above, the saving unit 141 saves, as touch history information, time information indicating a touch time when the operation body has touched each position of the screen.

Furthermore, the saving unit 141 generates number-of-times information indicating the number of times of touches in which the operation body has touched each position of the screen based on the acquired operation signals. For example, the saving unit 141 generates, as number-of-times information, the number of times of touches (e.g., once, twice, or ten times) in which the operation body has touched each position of the screen within a predetermined time. Subsequently, the saving unit 141 generates, as touch history information, information in which the generated number-of-times information is associated with the position information. After generating the touch history information, the saving unit 141 saves the generated touch history information in the storage unit 120. As described above, the saving unit 141 saves, as touch history information, number-of-times information indicating the number of times of touches in which the operation body has touched each position of the screen.

Furthermore, the saving unit 141 may generate, as touch history information, information in which image information at a touch time point when the operation body has touched each position of the screen is associated with the position information, the time information, and the number-of-times information as described above. After generating the touch history information, the saving unit 141 saves the generated touch history information in the storage unit 120. As described above, the saving unit 141 may save, as touch history information, the image information at a touch time point when the operation body has touched each position of the screen.

The processing unit 142 executes processing based on touch history information saved by the saving unit 141. For example, the processing unit 142 displays pieces of touch information in time-series order at respective positions indicated by pieces of position information based on the pieces of position information in time series saved by the saving unit 141. For example, the processing unit 142 displays the touch information for a display time (e.g., 0.1 or 0.3 seconds) designated by the user. Furthermore, the processing unit 142 reduces the visibility of the touch information as time in the display time proceeds.

Display processing performed by the processing unit 142 will be specifically described below with reference to FIGS. 2 to 9. Furthermore, FIGS. 2 to 9 illustrate a case where a touch operation is input to a game screen displayed on a screen of a smartphone by one finger of the user.

Figure 2:
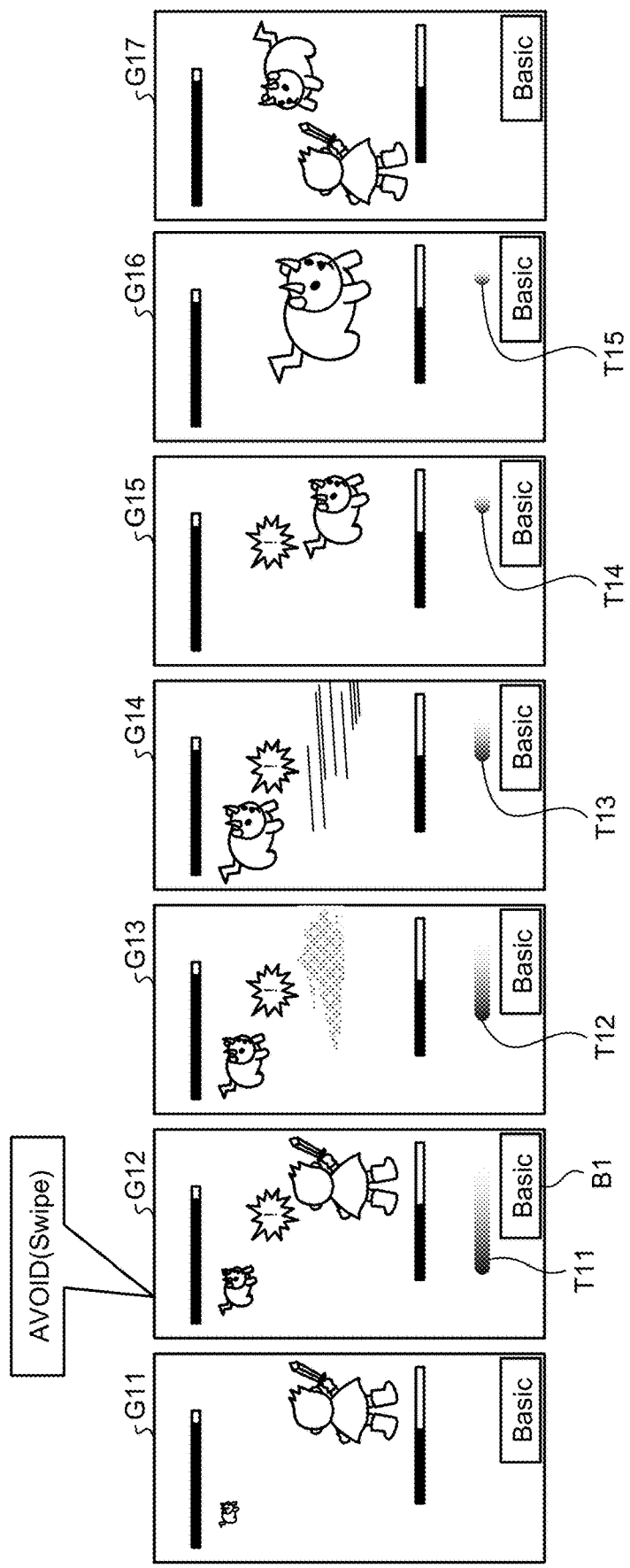
FIG. 2 illustrates one example of a screen displaying a trajectory of a swipe operation in a lateral direction to a game screen according to the embodiment.

FIG. 2 illustrates one example of a screen displaying a trajectory of a swipe operation in a lateral direction to a game screen according to the embodiment of the present disclosure. For easy understanding, FIG. 2 illustrates game screens G11 to G17 arranged from left to right in time-series order. The game screens G11 to G17 illustrate two fighting characters. In FIG. 2, the user inputs a swipe operation from left to right in a lateral direction on the game screen G12 with his/her finger as a touch operation for causing a character to be operated by the user to avoid a character of an opponent. The processing unit 142 superimposes and displays a trajectory T11 of the input swipe operation in the lateral direction on the game screen G12.

The processing unit 142 displays each point of the trajectory T11 for a display time (e.g., 0.1 or 0.3 seconds) designated by the user. For example, in the game images G12 to G16 in FIG. 2, a position on a more left side of the trajectory T11 has been touched at an earlier time point. The display time of the trajectory T11 ends sequentially from the left of the trajectory T11, and the trajectory T11 disappears from the screen. For example, a trajectory 112 on the game image G13 following the game image G12 is shorter than the trajectory T11 since a display time of a left part of the trajectory T11 has ended and the left part of the trajectory T11 has disappeared. Furthermore, a trajectory T13 on the game image G14 following the game image G13 is shorter than the trajectory T12 since a display time of a left part of the trajectory T12 has ended and the left part of the trajectory T12 has disappeared. Furthermore, a trajectory T14 on the game image G15 following the game image G14 is shorter than the trajectory T13 since a display time of a left part of the trajectory T13 has ended and the left part of the trajectory T13 has disappeared. Furthermore, a trajectory T15 on the game image G16 following the game image G15 is shorter than the trajectory T14 since a display time of a left part of the trajectory T14 has ended and the left part of the trajectory T14 has disappeared. Furthermore, since a display time of the trajectory T15 has ended, the trajectory has disappeared from the screen on the game image G17 following the game image G16.

Figure 5:
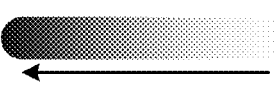
FIG. 5 illustrates one example of the correspondence relation between each operation and touch information in a first basic mode according to the embodiment.

Furthermore, a button B1 in which characters of "Basic" are displayed is illustrated on each screen in FIG. 2. When selecting the button B1, the user can change the display mode of the trajectory. Here, three types of basic modes to be described later with reference to FIGS. 5 to 7 are provided as display modes of the trajectory. When selecting the button B1, the user can select a desired mode from the three types of basic modes, and switches the display mode to the selected mode.

Figure 3:
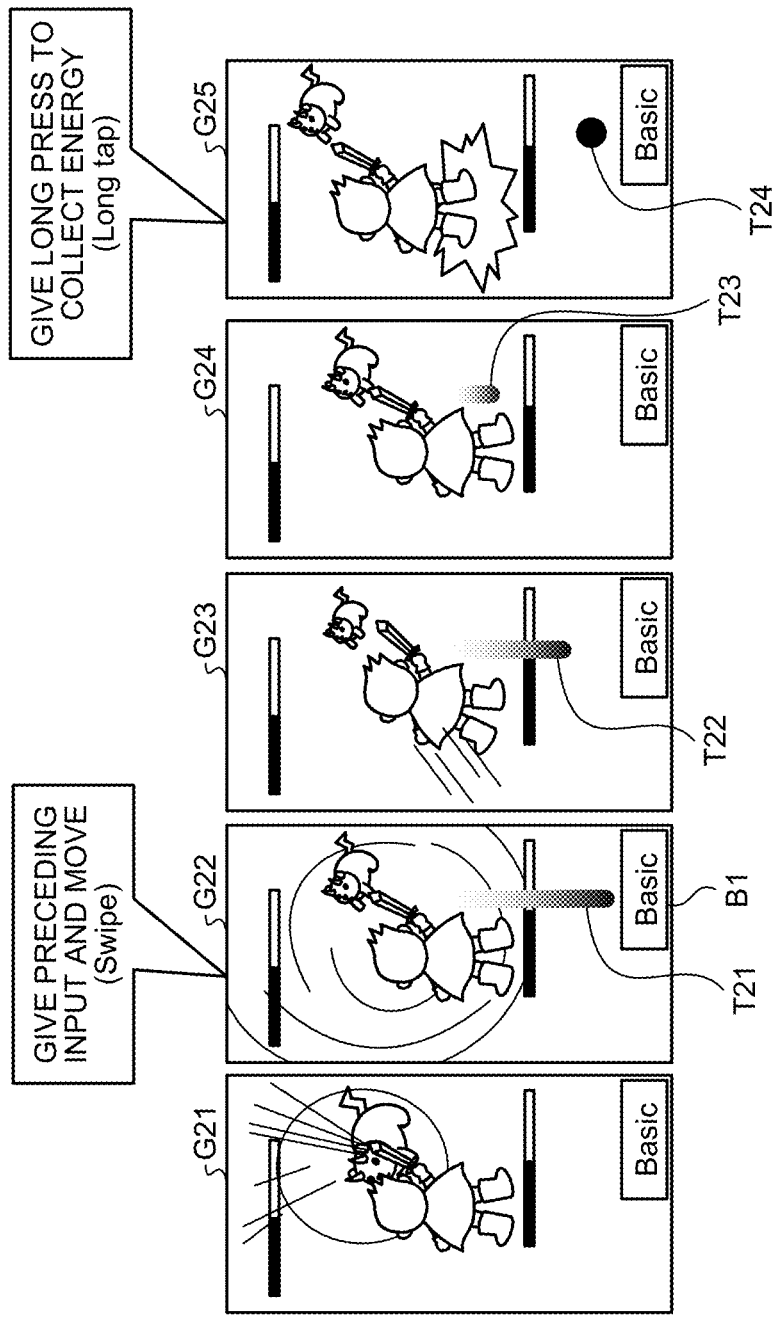
FIG. 3 illustrates one example of a screen displaying a trajectory of a swipe operation and a long press operation in a longitudinal direction to a game screen according to the embodiment.

FIG. 3 illustrates one example of a screen displaying a trajectory of a swipe operation and a long press operation in a longitudinal direction to a game screen according to the embodiment of the present disclosure. For easy understanding, as in FIG. 2, FIG. 3 illustrates game screens G21 to G25 arranged from left to right in time-series order. The game screens G21 to G25 illustrate two fighting characters. In FIG. 3, the user inputs a swipe operation from bottom to top in a longitudinal direction on the game screen G22 with his/her finger as a touch operation for moving a character to be operated by the user. The processing unit 142 superimposes and displays a trajectory T21 of the input swipe operation in the longitudinal direction on the game screen G22. Furthermore, in the game images G22 to G24 in FIG. 3, a position on a more bottom side of the trajectory T21 has been touched at an earlier time point. The display time of the trajectory T21 ends sequentially from the bottom of the trajectory T21, and the trajectory T21 disappears from the screen. Furthermore, in FIG. 3, the user inputs a long press operation of long-pressing a predetermined position on the screen with his/her finger on the game screen G25 as a touch operation for the character to be operated by the user to collect energy for an attack. The processing unit 142 superimposes and displays a trajectory T24 indicating the position of the input long press operation on the game screen G25.

Figure 4:
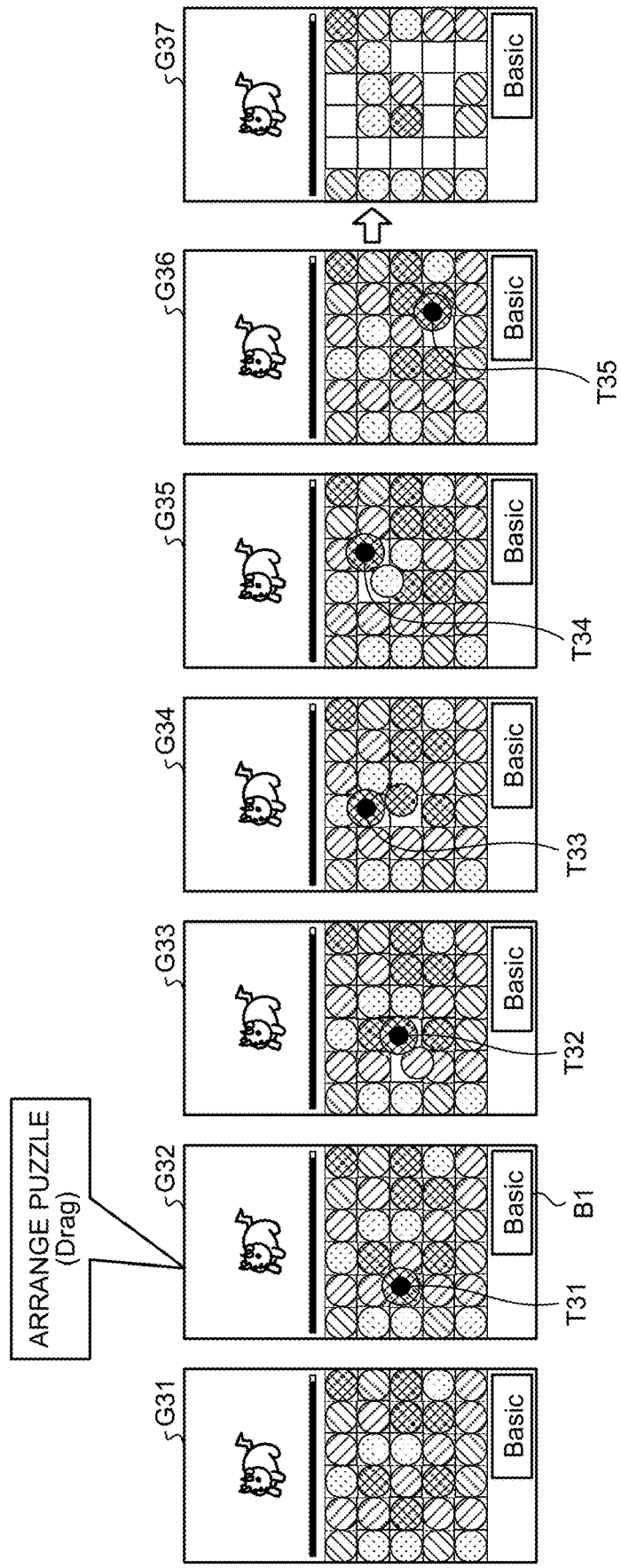
FIG. 4 illustrates one example of a screen displaying a trajectory of a drag operation to a game screen according to the embodiment.

FIG. 4 illustrates one example of a screen displaying a trajectory of a drag operation to a game screen according to the embodiment of the present disclosure. For easy understanding, FIG. 4 illustrates game screens G31 to G37 arranged from left to right in time-series order. The game screens G31 to G37 illustrate how the user moves a puzzle of a puzzle game. In FIG. 4, the user inputs drag operations of dragging a puzzle with his/her finger on the game screens G32 to G36 as touch operations for moving a puzzle to be operated by the user. The processing unit 142 superimposes and displays trajectories T31 to T35 of the input drag operations on the game screens G32 to G36, respectively.

Furthermore, the processing unit 142 determines the type of a touch operation based on the touch history information saved by the saving unit 141. The processing unit 142 displays touch information indicating that an operation body has touched the screen in a different display mode in accordance with the determined type of a touch operation.

FIG. 5 illustrates one example of the correspondence relation between each operation and touch information in a first basic mode according to the embodiment of the present disclosure. In a "shot press" operation in FIG. 5, a screen is tapped (lightly touched) once with a fingertip. The "shot press" operation is also called a tap (single tap). When the user taps the screen, the processing unit 142 displays, as one example of the touch information, a dotted image for expressing a special effect of blinking twice short at the position tapped by the user. More specifically, the processing unit 142 determines that the type of a touch operation input by the user is a "shot press" operation based on position information, time information, and number-of-times information saved by the saving unit 141. When determining that the type of a touch operation is a "shot press" operation, the processing unit 142 displays a dotted image for expressing a special effect of blinking twice short at the position tapped by the user. Furthermore, the processing unit 142 displays an image of a color selected by the user.

Furthermore, in a "long press" operation in FIG. 5, the screen is long-pressed with a fingertip. The "long press"

operation is also called a long tap. When the user long-taps the screen, the processing unit 142 displays, as one example of the touch information, a dotted image for expressing a special effect of blinking twice short for a time longer than that in a case of a "shot press" operation at the position long-tapped by the user. More specifically, the processing unit 142 determines that the type of a touch operation input by the user is a "long press" operation based on position information, time information, and number-of-times information saved by the saving unit 141 saved by the saving unit 141. When determining that the type of a touch operation is a "long press" operation, the processing unit 142 displays a dotted image for expressing a special effect of blinking twice short for a time longer than that in a case of a "shot press" operation at the position long-tapped by the user. As described above, the processing unit 142 displays touch information in a different display mode in accordance with the time information saved by the saving unit 141.

Furthermore, in a "double tap" operation in FIG. 5, the screen is tapped twice with a fingertip. When the user double-taps the screen, the processing unit 142 displays twice, as one example of the touch information, a dotted image for expressing a special effect of blinking twice short at the position double-tapped by the user. More specifically, the processing unit 142 determines that the type of a touch operation input by the user is a "double tap" operation based on position information, time information, and number-of-times information saved by the saving unit 141 saved by the saving unit 141. When determining that the type of a touch operation is a "double tap" operation, the processing unit 142 displays, twice, a dotted image for expressing a special effect of blinking twice short at the position double-tapped by the user.

Furthermore, in a "repeated tap" operation in FIG. 5, the screen is repeatedly tapped three or more times with a fingertip. When the user repeatedly taps the screen three or more times, the processing unit 142 displays, as one example of the touch information, a dotted image for expressing a special effect of blinking twice short at the position repeatedly tapped three or more times by the user three or more times while the user taps the screen. More specifically, the processing unit 142 determines that the type of a touch operation input by the user is a "repeated tap" operation based on position information, time information, and number-of-times information saved by the saving unit 141 saved by the saving unit 141. When determining that the type of a touch operation is a "repeated tap" operation, the processing unit 142 displays, three or more times, a dotted image for expressing a special effect of blinking twice short at the position repeatedly tapped three or more times by the user. As described above, the processing unit 142 displays touch information in a different display mode in accordance with the number-of-times information saved by the saving unit 141.

Furthermore, in a "swipe" operation in FIG. 5, the screen is touched with a fingertip, and the fingertip is slid on the screen. When the user performs a swipe operation on the screen, the processing unit 142 displays, as one example of the touch information, a trajectory of a dotted image for expressing a special effect of blinking twice short at the position where the user has performed the swipe operation along a line obtained by the user performing sliding on the screen. More specifically, the processing unit 142 determines that the type of a touch operation input by the user is a "swipe" operation based on position information, time information, and number-of-times information saved by the saving unit 141 saved by the saving unit 141. When determining that the type of a touch operation is a "swipe" operation, the processing unit 142 displays a trajectory of a dotted image for expressing a special effect of blinking twice short at the position where the user has performed the swipe operation. Furthermore, as described above with reference to FIGS. 2 and 3, a line of a trajectory corresponding to a swipe operation disappears from the screen in order of inputs since a display time ends in order of inputs. As described above, the processing unit 142 displays pieces of touch information in time-series order at respective positions indicated by pieces of position information based on the pieces of position information in time series saved by the saving unit 141.

FIG. 6 illustrates one example of the correspondence relation between each operation and touch information in a second basic mode according to the embodiment of the present disclosure. In the second basic mode in FIG. 6, as in FIG. 5, when the user taps the screen, the processing unit 142 displays, as one example of the touch information, a dotted image for expressing a special effect of blinking twice short at the position tapped by the user. Furthermore, when the user long-taps the screen, the processing unit 142 displays, as one example of the touch information, an image for expressing a special effect of light in a circle blinking while contracting at the position long-tapped by the user until the user releases his/her finger from the screen. More specifically, the processing unit 142 determines that the type of a touch operation input by the user is a "long press" operation based on position information, time information, and number-of-times information saved by the saving unit 141 saved by the saving unit 141. When determining that the type of the touch operation is a "long press" operation, the processing unit 142 displays an image for expressing a special effect of light in a circle blinking while contracting at the position long-tapped by the user until the user releases his/her finger from the screen.

Furthermore, when the user double-taps the screen, the processing unit 142 displays, as one example of the touch information, an image indicating a double circle at the position double-tapped by the user. More specifically, the processing unit 142 determines that the type of a touch operation input by the user is a "double tap" operation based on position information, time information, and number-of-times information saved by the saving unit 141 saved by the saving unit 141. When determining that the type of a touch operation is a "double tap" operation, the processing unit 142 displays an image indicating a double circle at the position double-tapped by the user.

Furthermore, when the user repeatedly taps the screen three or more times, the processing unit 142 displays, as one example of the touch information, an image indicating a triple circle. Furthermore, the processing unit 142 changes the color of the image indicating a triple circle at the time when three or more times of repeated taps are given for each tap, and displays the image at the position repeatedly tapped three or more times by the user. More specifically, the processing unit 142 determines that the type of a touch operation input by the user is a "repeated tap" operation based on position information, time information, and number-of-times information saved by the saving unit 141 saved by the saving unit 141. When determining that the type of a touch operation is a "repeated tap" operation, the processing unit 142 displays an image indicating a triple circle.

Furthermore, when the user performs a swipe operation on the screen, the processing unit 142 colors a region on the screen where a touch pressure has been detected, and displays the region on the position where the user has performed the swipe operation as one example of the touch information. More specifically, the processing unit 142 determines that the type of a touch operation input by the user is a "swipe" operation based on position information, time information, and number-of-times information saved by the saving unit 141 saved by the saving unit 141. When determining that the type of the touch operation is a "swipe" operation, the processing unit 142 colors a region on the screen where a touch pressure has been detected, and displays the region at the position where the user has performed the swipe operation.

FIG. 7 illustrates one example of the correspondence relation between each operation and touch information in a third basic mode according to the embodiment of the present disclosure. In the third basic mode in FIG. 7, when the user taps the screen, the processing unit 142 displays, as one example of the touch information, an image for expressing a special effect (hereinafter, abbreviated as "shot press effect") at the position tapped by the user. In the shot press effect, a small point indicating a tapped position gradually increases in size. The small point changes from a point to a circle. The size of the circle gradually increases while the thickness of the circle gradually increases. After the changes, the circle changes to have a shape surrounding a point. More specifically, the processing unit 142 determines that the type of a touch operation input by the user is a "shot press" operation based on position information, time information, and number-of-times information saved by the saving unit 141. When determining that the type of a touch operation is a "shot press" operation, the processing unit 142 displays a shot press effect at the position tapped by the user.

Furthermore, when the user double-taps the screen, the processing unit 142 repeatedly displays, as one example of the touch information, a shot press effect twice at the position double-tapped by the user. More specifically, the processing unit 142 determines that the type of a touch operation input by the user is a "double tap" operation based on position information, time information, and number-of-times information saved by the saving unit 141 saved by the saving unit 141. When determining that the type of a touch operation is a "double tap" operation, the processing unit 142 repeatedly displays a shot press effect twice at the position double-tapped by the user.

Furthermore, when the user repeatedly taps the screen three or more times, the processing unit 142 repeatedly displays, as one example of the touch information, a shot press effect three or more times at the position repeatedly tapped three or more times by the user while the user repeats tapping. More specifically, the processing unit 142 determines that the type of a touch operation input by the user is a "repeated tap" operation based on position information, time information, and number-of-times information saved by the saving unit 141 saved by the saving unit 141. When determining that the type of a touch operation is a "repeated tap" operation, the processing unit 142 repeatedly displays a shot press effect three or more times at the position repeatedly tapped three or more times by the user while the user repeats tapping.

Furthermore, as in FIG. 6, when the user performs a swipe operation on the screen, the processing unit 142 colors a region on the screen where a touch pressure has been detected, and displays the region on the position where the user has performed the swipe operation as one example of the touch information.

FIG. 8 illustrates one example of a screen displaying a trajectory of each operation in a game screen of an FPS according to the embodiment of the present disclosure. A first-person shooter (FPS) refers to a game operated from a viewpoint (first-person) of a character to be operated. A button B2 in which characters of "FPS mode" are displayed is illustrated on a screen G41 in FIG. 8. The button B2 indicates that the display mode of a trajectory is an FPS track mode. In the FPS track mode, the processing unit 142 superimposes characters indicating the type of each operation on a region of each of trajectories T41 to T45 of each operation, and displays the characters on the screen G41.

FIG. 9 illustrates one example of the correspondence relation between each operation and touch information in the FPS track mode according to the embodiment of the present disclosure. In the FPS track mode in FIG. 9, when the user taps the screen, the processing unit 142 displays, as one example of the touch information, an image in which a character of "S" indicating a shot press operation is displayed in a circle at the position tapped by the user. More specifically, the processing unit 142 determines that the type of a touch operation input by the user is a "shot press" operation based on position information, time information, and number-of-times information saved by the saving unit 141. When determining that the type of a touch operation is a "shot press" operation, the processing unit 142 displays an image in which a character of "S" indicating a shot press operation is displayed in a circle at the position tapped by the user.

Furthermore, when the user long-taps the screen, the processing unit 142 displays, as one example of the touch information, an image in which a character of "L" indicating a long press operation is displayed in a circle at the position long-tapped by the user. More specifically, the processing unit 142 determines that the type of a touch operation input by the user is a "shot press" operation based on position information, time information, and number-of-times information saved by the saving unit 141. When determining that the type of a touch operation is a "shot press" operation, the processing unit 142 displays an image in which a character of "L" indicating a long press operation is displayed in a circle at the position long-tapped by the user.

Furthermore, when the user double-taps the screen, the processing unit 142 displays, as one example of the touch information, an image in which two characters of "DT" indicating a double tap are displayed in a circle at the position double-tapped by the user. More specifically, the processing unit 142 determines that the type of a touch operation input by the user is a "double tap" operation based on position information, time information, and number-of-times information saved by the saving unit 141 saved by the saving unit 141. When determining that the type of a touch operation is a "double tap" operation, the processing unit 142 displays an image in which two characters of "DT" indicating a double tap are displayed in a circle at the position double-tapped by the user.

Furthermore, when the user repeatedly taps the screen three or more times, the processing unit 142 displays, as one example of the touch information, an image in which two characters of "RT" indicating a repeated tap are displayed in a circle at the position repeatedly tapped three or more times by the user. More specifically, the processing unit 142 determines that the type of a touch operation input by the user is a "repeated tap" operation based on position information, time information, and number-of-times information saved by the saving unit 141 saved by the saving unit 141. When determining that the type of a touch operation is a "repeated tap" operation, the processing unit 142 displays an image in which two characters of "RT" indicating a repeated tap are displayed in a circle at the position repeatedly tapped three or more times by the user.

Furthermore, when the user performs a swipe operation on the screen, the processing unit 142 displays, as one example of the touch information, an image, in which two characters of "SW" indicating a swipe operation are displayed in a region on the screen where a touch pressure has been detected, at the position where the user has performed the swipe operation. More specifically, the processing unit 142 determines that the type of a touch operation input by the user is a "swipe" operation based on position information, time information, and number-of-times information saved by the saving unit 141 saved by the saving unit 141. When determining that the type of a touch operation is a "swipe" operation, the processing unit 142 displays an image, in which two characters of "SW" indicating a swipe operation are displayed in a region on the screen where a touch pressure has been detected, at the position where the user has performed the swipe operation.

Furthermore, when the user performs a drag operation on the screen, the processing unit 142 displays, as one example of the touch information, an image in which characters of "DG" indicating a drag operation are displayed in a circle at the position where the user has performed the drag operation. More specifically, the processing unit 142 determines that the type of a touch operation input by the user is a "drag" operation based on position information, time information, and number-of-times information saved by the saving unit 141 saved by the saving unit 141. When determining that the type of a touch operation is a "drag" operation, the processing unit 142 displays an image in which characters of "DG" indicating a drag operation are displayed in a circle at the position where the user has performed the drag operation.

Figure 10:
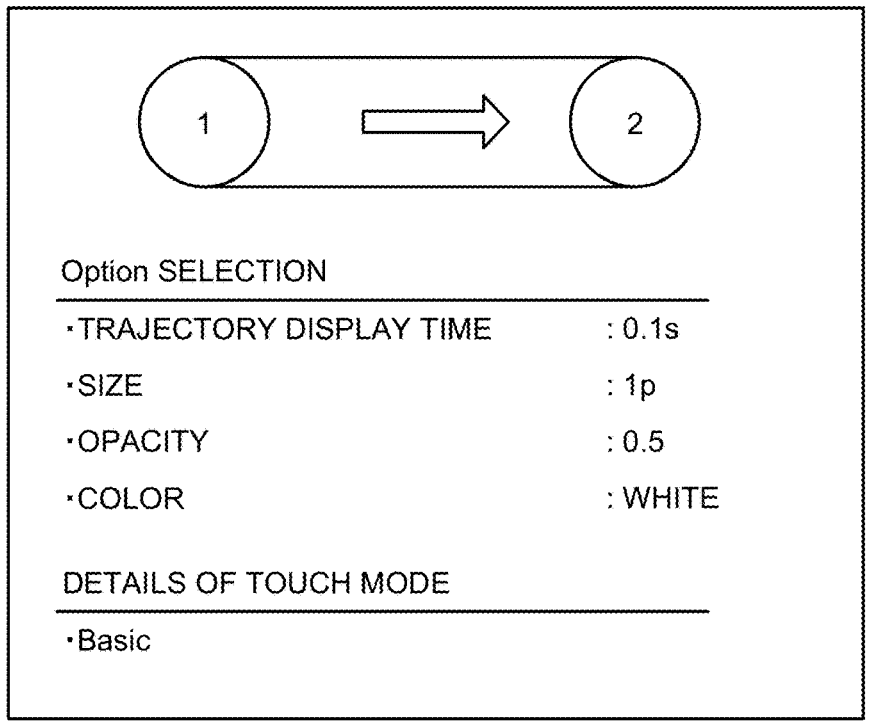
FIG. 10 illustrates one example of a UI screen for changing an operation trajectory according to the embodiment.

FIG. 10 illustrates one example of a UI screen for changing an operation trajectory according to the embodiment of the present disclosure. FIG. 10 illustrates one example of a UI screen on which the display mode of touch information can be changed in accordance with preference of the user. The processing unit 142 displays a UI screen as illustrated in FIG. 10 in accordance with a user operation. The processing unit 142 changes information on the display mode of the touch information in accordance with an input operation of the user to the UI screen. Specifically, the processing unit 142 updates the information on the display mode of the touch information in the storage unit 120. Furthermore, the processing unit 142 displays the touch information in accordance with the updated information on the display mode of the touch information. Note that the touch information may be hereinafter referred to as a "trajectory".

Specifically, when a number input to an input field for an item of a "trajectory display time" on the UI screen is changed in accordance with a user operation, the processing unit 142 changes a display time of a trajectory (time from when trajectory is displayed to when trajectory disappears). For example, the processing unit 142 changes the display time of a trajectory such that the trajectory disappears after "0.1" seconds or the trajectory disappears after "0.3" seconds in accordance with a number (e.g., "0.1" and "0.3") input to the input field for the item of the "trajectory display time" on the UI screen.

Furthermore, when a number input to an input field for an item of a "size" on the UI screen is changed in accordance with a user operation, the processing unit 142 changes the thickness of a trajectory in accordance with the number input to the input field. Here, for example, in a case of a dotted trajectory, the thickness of the trajectory indicates the size of the dots. Furthermore, in a case of a linear trajectory, the thickness of the trajectory indicates the thickness of the line.

Furthermore, when a number input to an input field for an item of "opacity" on the UI screen is changed in accordance with a user operation, the processing unit 142 changes the opacity of the trajectory in accordance with the number input to the input field. For example, the processing unit 142 changes the opacity of the trajectory such that the opacity is increased as the number input to the input field is increased.

Furthermore, when color information indicating color input to an input field for an item of "color" on the UI screen is changed in accordance with a user operation, the processing unit 142 changes the color of the trajectory in accordance with the color information input to the input field. For example, the processing unit 142 displays color information such as red, blue, and green with white being defined as a basic color (default) such that the colors can be selected by a pull-down operation.

Furthermore, when a display mode of the trajectory input to an input field for an item of "details of touch mode" on the UI screen is changed in accordance with a user operation, the processing unit 142 changes the display mode of the trajectory in accordance with the display mode input to the input field. For example, the processing unit 142 displays the first basic mode, the second basic mode, the third basic mode, or the FPS track mode such that these modes can be selected by a pull-down operation.

Furthermore, although not illustrated, the processing unit 142 may display an item and an input field for a saving time of touch history information on the UI screen. For example, when a number input to the input field for the saving time of touch history information is changed, the processing unit 142 changes the saving time of the touch history information in accordance with the number input to the input field. The saving unit 141 saves touch history information only for a time in accordance with the number input to the input field. Note that the processing unit 142 may display, on the UI screen, information indicating that the user can select an option of not saving the touch history information.

Figure 11:
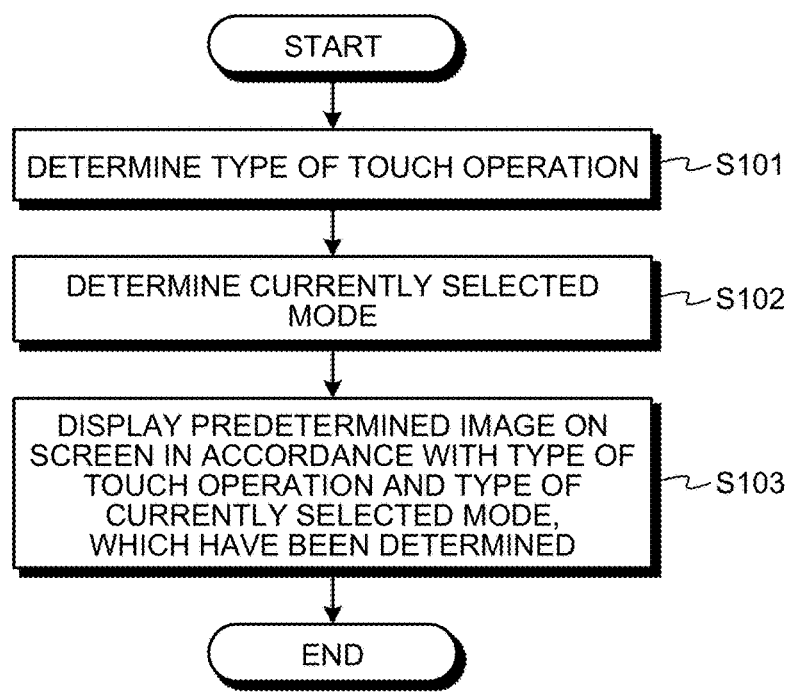
FIG. 11 is a flowchart illustrating a touch information processing procedure according to the embodiment.

FIG. 11 is a flowchart illustrating a touch information processing procedure according to the embodiment of the present disclosure. The processing unit 142 determines the type of a touch operation (Step S101). For example, the processing unit 142 determines the type of a touch operation input by the user based on position information, time information, and number-of-times information saved by the saving unit 141. Subsequently, the processing unit 142 determines the currently selected mode (Step S102). For example, the processing unit 142 refers to the storage unit 120 to determine the currently selected mode. Subsequently, the processing unit 142 displays a predetermined image on a screen in accordance with the type of a touch operation and the type of the currently selected mode, which have been determined (Step S103).

3. Variation

The information processing apparatus 100 according to the above-described embodiment may be implemented in various different forms other than the above-described embodiment. Thus, another embodiment of the information processing apparatus 100 will be described below. Note that the same reference signs are attached to the same parts as those in the embodiment to omit description.

In the above-described embodiment, a case where the information processing apparatus 100 distributes a video in which information visualizing a history of touch operations performed by the player to the game screen is superimposed and displayed on the game screen has been described from the position of the distributor who performs game distribution. In a variation, the information processing apparatus 100 saves a history of touch operations to a game screen performed by a player (e.g., distributor) from the position of a viewer viewing the distributed game screen. Then, a case where the information processing apparatus 100 executes a function of reproducing the saved history of touch operations (hereinafter, also referred to as macro function) in response to a call from the user will be described.

Figure 12:
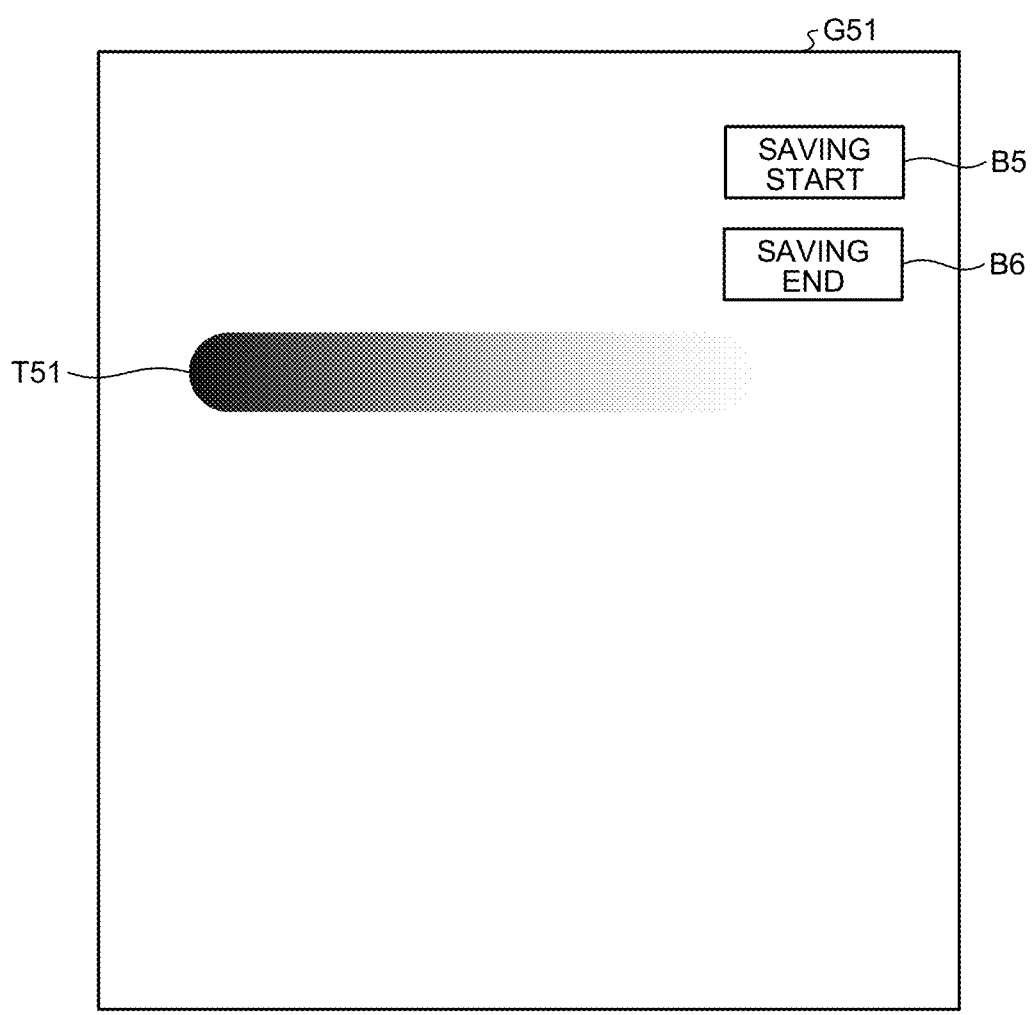
FIG. 12 illustrates one example of a macro function creation screen according to the embodiment.
Figure 13:
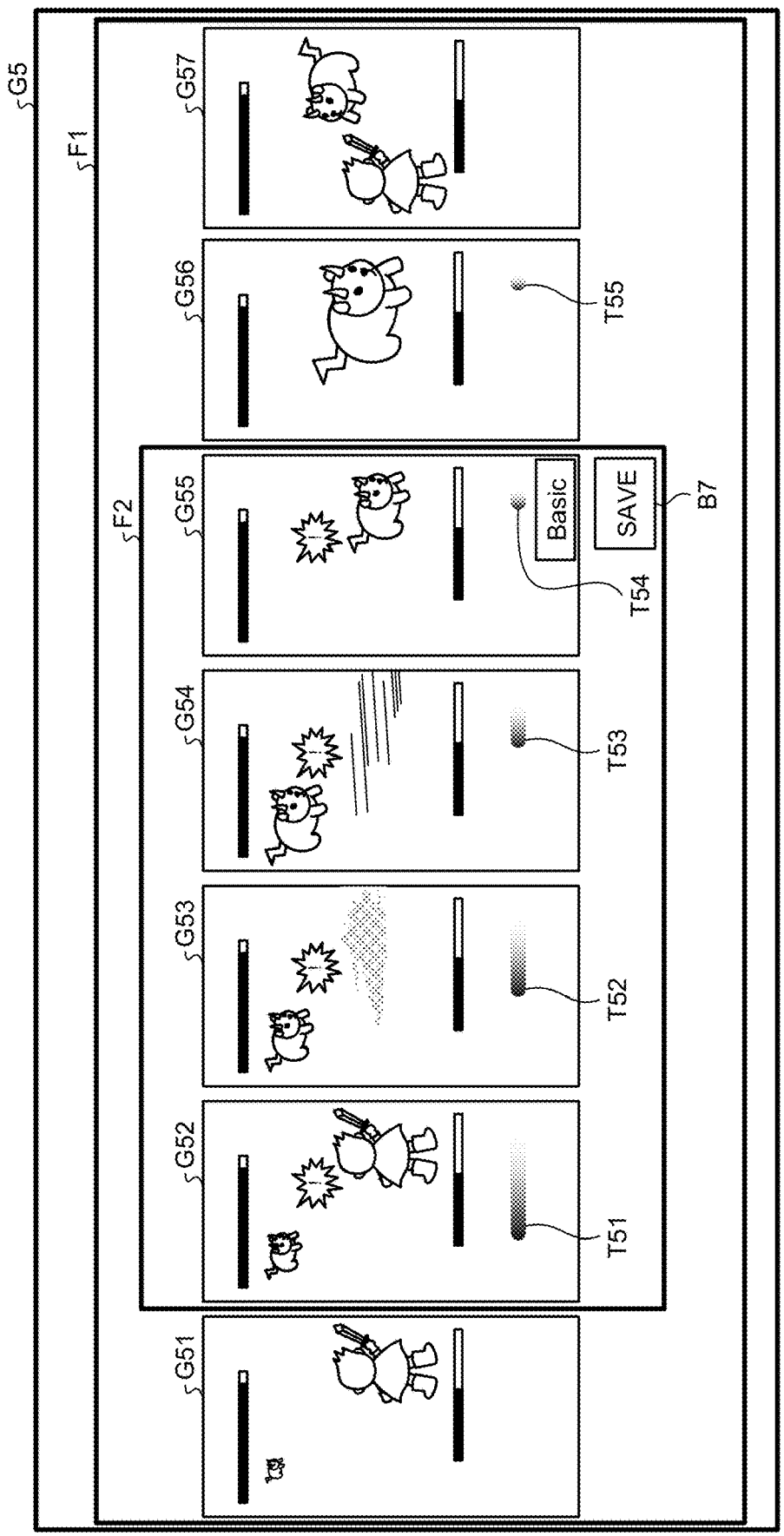
FIG. 13 illustrates one example of an edit screen according to the embodiment.

Specifically, in FIGS. 12 to 13, the saving unit 141 saves a history of touch operations in a relatively short time such as several seconds to several tens of seconds as macro information. As a result, the information processing apparatus 100 can enable the user who is a viewer to execute a difficult game operation performed by a person who is good at the game such as a distributor and a special game operation at a terminal device of the viewer. Note that the player and the user may be the same person. When the player and the user are the same person, the information processing apparatus 100 can completely reproduce a game operation performed by the user in the past.

FIG. 12 illustrates one example of a macro function creation screen according to the embodiment of the present disclosure. The saving unit 141 saves touch history information within a period from a start point of time designated by the user to an end point of time designated by the user. In FIG. 12, when the user selects a button B5, the saving unit 141 starts to save touch history information T51. The button B5 is displayed on a macro function creation screen G51. In the button B5, characters of "saving start" are displayed. The touch history information T51 is displayed on the macro function creation screen G51. Subsequently, when the user selects a button B6, the saving unit 141 ends the saving of the touch history information T51. The button B6 is displayed on the macro function creation screen G51. In the button B6, characters of "saving end" are displayed. The touch history information T51 is displayed on the macro function creation screen G51. When ending the saving of the touch history information T51, the saving unit 141 generates macro information M1 corresponding to the saved touch history information T51. After generating macro information M51, the saving unit 141 saves the generated macro information M1 in the storage unit 120. The processing unit 142 executes a touch operation in accordance with the macro information M1 based on the macro information M1 saved by the saving unit 141. For example, the processing unit 142 receives, from the user, designation of an execution date and time when the touch operation in accordance with the macro information M1 is to be executed. The processing unit 142 executes the touch operation in accordance with the macro information M1 on the date and time designated by the user.

FIG. 13 illustrates one example of an edit screen according to the embodiment of the present disclosure. FIG. 13 illustrates an edit screen G5 for touch history information. The edit screen G5 includes game screens G51 to G57. The game screens G51 to G57 illustrate two fighting characters similar to those in FIG. 2 described above. The game screens G51 to G57 are arranged from left to right in time-series order in a frame F1. In FIG. 13, the saving unit 141 receives, from the user, an operation of moving a frame F2. When the user selects a button B7, the saving unit 141 saves touch history information T61 on a touch operation corresponding to trajectories T51 to T54. The button B7 is displayed in the frame F2. In the button B7, characters of "save" are displayed. The trajectories T51 to T54 are displayed in game screens G52 to G55. The game screens G52 to G55 are displayed in the frame F2. When ending the saving of the touch history information T61, the saving unit 141 generates macro information M2 corresponding to the saved touch history information T61. After generating the macro information M51, the saving unit 141 saves the generated macro information M2 in the storage unit 120. The processing unit 142 executes a touch operation in accordance with the macro information M2 based on the macro information M2 saved by the saving unit 141. For example, the processing unit 142 displays, on a screen, a macro button for executing a touch operation in accordance with the macro information M2. Subsequently, when receiving a macro button selection operation from the user, the processing unit 142 executes the touch operation in accordance with the macro information M2.

Furthermore, although, in the above-described embodiment, a case has been described in which the processing unit 142 displays a dotted or circular image as illustrated with reference to FIGS. 5 to 7 and 9 as touch information indicating that an operation body has touched a screen, the touch information is not limited to the dotted or circular image. For example, instead of the dotted or circular image, the processing unit 142 may display, as touch information indicating that the operation body has touched the screen, an image having a shape other than the dotted or circular shape (e.g., quadrangular shape and triangular shape), a character, a still image such as an illustration, and a video such as an animation.

Furthermore, although, in the above-described embodiment, a case where a user (operator) who performs a touch operation to a screen uses the information processing apparatus 100 has been described, this is not a limitation. In the following description, the information processing apparatus 100 used by a first user is described as an "information processing apparatus 100-1". The first user is an operator who performs a touch operation on a screen. The information processing apparatus 100 used by a second user is described as an "information processing apparatus 100-2". The second user is a viewer viewing the screen operated by the first user.

Specifically, the information processing apparatus 100-1 transmits, to the information processing apparatus 100-2, touch history information indicating a history of touch operations performed by the first user to the screen. For example, the information processing apparatus 100-1 transmits the touch history information of the first user to the information processing apparatus 100-2 together with a game screen which has been the target of a touch operation of the first user. The information processing apparatus 100-2 receives the touch history information of the first user from the information processing apparatus 100-1. For example, the information processing apparatus 100-2 receives the touch history information of the first user from the information processing apparatus 100-1 together with the game screen which has been the target of a touch operation of the first user. The saving unit 141 of the information processing apparatus 100-2 saves the touch history information of the first user received from the information processing apparatus 100-1. For example, the saving unit 141 of the information processing apparatus 100-2 saves the game screen which has been the target of a touch operation of the first user and the touch history information of the first user, which have been received from the information processing apparatus 100-1, in the storage unit 120 in association with each other. Furthermore, the processing unit 142 of the information processing apparatus 100-2 determines the type of a touch operation based on the touch history information of the first user saved by the saving unit 141. The processing unit 142 of the information processing apparatus 100-2 displays touch information indicating that the first user has touched the screen in a different display mode in accordance with the determined type of a touch operation. For example, the processing unit 142 of the information processing apparatus 100-2 displays touch information in a display mode corresponding to a mode selected by the second user from, in a case of a basic mode, the first to third basic modes, for example.

Furthermore, the information processing apparatus 100-1 may transmit the touch history information of the first user and mode information selected by the first user to the information processing apparatus 100-2 together with a video of the game screen as metadata of the game screen which has been the target of a touch operation of the first user (hereinafter, described as metadata). The information processing apparatus 100-2 receives the metadata from the information processing apparatus 100-1 together with the game screen which has been the target of a touch operation of the first user. The processing unit 142 of the information processing apparatus 100-2 refers to the storage unit 120 of the information processing apparatus 100-2 to determine the mode currently selected by the second user. Subsequently, the processing unit 142 of the information processing apparatus 100-2 displays a trajectory of a touch operation performed by the first user on the screen in accordance with the determined type of the mode currently selected by the second user.

Furthermore, the processing unit 142 of the information processing apparatus 100-2 may preliminarily learn the type of a mode preferably selected by the second user (hereinafter, mode preferred by second user), and automatically display the trajectory of a touch operation performed by the first user on the screen in accordance with the mode preferred by the second user. Furthermore, when the type of a game received from the information processing apparatus 100-1 can be determined as an FPS, the processing unit 142 of the information processing apparatus 100-2 may automatically display the trajectory of a touch operation performed by the first user on the screen in an FPS track mode. Furthermore, the processing unit 142 of the information processing apparatus 100-2 may select a mode in accordance with the type of a game and features of a game screen in accordance with the type (e.g., FPS, puzzle, race, and sport) of the game and the features, such as motion and color, of the game screen received from the information processing apparatus 100-1, and display the trajectory of a touch operation performed by the first user on the screen in the selected mode.

Furthermore, the information processing apparatus 100-1 may upload the touch history information of the first user to a server device that provides social networking service (SNS) instead of transmitting the touch history information of the first user to the information processing apparatus 100-2. Then, the information processing apparatus 100-2 may receive the touch history information of the first user from the server device that provides SNS instead of receiving the touch history information from the information processing apparatus 100-1. This enables the information processing apparatus 100-1 to visualize a combination of a screen and an operation history of touch operations to the screen through SNS and release the combination to a third party. Furthermore, the information processing apparatus 100-2 can view an operation history of touch operations to the screen released by a third party with the information processing apparatus 100-2 itself through SNS.

Furthermore, the saving unit 141 of the information processing apparatus 100-2 saves touch history information of the first user within a period from a start point of time designated by the second user to an end point of time designated by the second user from the touch history information of the first user. The processing unit 142 of the information processing apparatus 100-2 executes a touch operation performed by the first user based on the touch history information of the first user saved by the saving unit 141. This enables the information processing apparatus 100-2 to execute the operation history of touch operations to the screen released by the third party at the information processing apparatus 100-2 itself.

Furthermore, the processing unit 142 may generate macro information preferred by the user by using a first machine learning model in which a history of edits of touch history information performed by the user has been learned. Furthermore, the processing unit 142 may display a trajectory in a display mode preferred by the user by using a second machine learning model in which a display history of display modes of a trajectory has been learned.

Furthermore, although, in the above-described embodiment, a case where the screen is a touch panel has been described, the screen is not limited to a touch panel. Specifically, although not illustrated, the information processing apparatus 100 may be mounted with a sensor capable of detecting a touch operation on the screen separately from the screen. For example, the saving unit 141 acquires, from the sensor, touch history information detected by the sensor. Subsequently, the saving unit 141 saves the acquired touch history information.

Furthermore, although, in the above-described embodiment, a case where the saving unit 141 saves image information, position information, time information, and number-of-times information as touch history information has been described, the saving unit 141 may save another piece of information. Specifically, when pressure information indicating a touch pressure at the time when an operation body touches each position of the screen can be acquired, the saving unit 141 may save the pressure information as touch history information. For example, the saving unit 141 generates, as the pressure information, a numerical value indicating a touch pressure at the time when an operation body touches each position of the screen. For example, when a resistive film method is adopted as a detection method of detecting a touch operation to the screen, the saving unit 141 generates, as pressure information, a numerical value of a change in voltage indicating a touch pressure. Furthermore, when an electrostatic capacitance method is adopted as the detection method, the saving unit 141 generates, as pressure information, a numerical value of a change in electrostatic capacitance indicating a touch pressure. Subsequently, the saving unit 141 generates, as touch history information, information in which the generated pressure information is associated with the position information. After generating the touch history information, the saving unit 141 saves the generated touch history information in the storage unit 120. As described above, the saving unit 141 saves, as touch history information, pressure information indicating a touch pressure at the time when an operation body touches each position of the screen. Furthermore, the processing unit 142 may change the size of an image in accordance with a touch pressure. For example, the processing unit 142 displays an image in a size made larger as a touch pressure of a touch operation input by the user is increased based on pressure information saved by the saving unit 141. As described above, the processing unit 142 displays touch information in a different display mode in accordance with the pressure information saved by the saving unit 141.

4. Effects

As described above, the information processing apparatus 100 according to the embodiment or the variation of the present disclosure includes the saving unit 141 and the processing unit 142. The saving unit 141 saves the touch history information indicating a history of touch operations performed by an operation body for performing a touch operation to the screen. The processing unit 142 executes processing based on touch history information saved by the saving unit 141.

This enables the information processing apparatus 100 to reproduce a touch operation to a screen.

Furthermore, the processing unit 142 determines the type of a touch operation based on the touch history information saved by the saving unit 141. The processing unit 142 displays touch information indicating that an operation body has touched the screen in a different display mode in accordance with the determined type of a touch operation.

This enables the information processing apparatus 100 to visualize a touch operation to the screen in a different display mode in accordance with the type of a touch operation to the screen, so that a plurality of different touch operations to the screen can be visually identified.

Furthermore, the saving unit 141 saves, as pieces of touch history information, pieces of position information indicating a touch position where the operation body has touched the screen in time series. The processing unit 142 displays pieces of touch information in time-series order at respective positions indicated by pieces of position information based on the pieces of position information in time series saved by the saving unit 141.

This enables the information processing apparatus 100 to visualize a trajectory of a touch operation to the screen.

Furthermore, the processing unit 142 displays the touch information for a display time designated by the user.

This enables the information processing apparatus 100 to visualize a trajectory of a touch operation to the screen for a time preferred by the user.

Furthermore, the processing unit 142 reduces the visibility of the touch information as time in the display time proceeds.

This enables the information processing apparatus 100 to prevent trajectories of a plurality of touch operations to the screen from being simultaneously displayed in an overlapping manner, so that visibility of the trajectories of touch operations to the screen can be improved.

Furthermore, the saving unit 141 saves, as touch history information, time information indicating a touch time when the operation body has touched each position of the screen. The processing unit 142 displays touch information in a different display mode in accordance with the time information saved by the saving unit 141.

This enables the information processing apparatus 100 to display a plurality of touch operations having different lengths of touch times to the screen, such as a shot press operation and a long press operation, in different display modes, so that the plurality of touch operations having different lengths of touch times to the screen can be visually identified.

Furthermore, the saving unit 141 saves, as touch history information, number-of-times information indicating the number of times of touches in which the operation body has touched each position of the screen. The processing unit 142 displays touch information in a different display mode in accordance with the number-of-times information saved by the saving unit 141.

This enables the information processing apparatus 100 to display a plurality of touch operations having the different numbers of times of touches to the screen, such as a shot press operation and a double tap operation, in different display modes, so that the plurality of touch operations having the different numbers of times of touches to the screen can be visually identified.

Furthermore, the saving unit 141 saves, as touch history information, pressure information indicating a touch pressure at the time when an operation body touches each position of the screen. The processing unit 142 displays touch information in a different display mode in accordance with the pressure information saved by the saving unit 141.

This enables the information processing apparatus 100 to visually identify touch operations having different touch pressures to the screen.

Furthermore, the saving unit 141 saves touch history information within a period from a start point of time designated by the user to an end point of time designated by the user.

This enables the information processing apparatus 100 to generate a macro function for executing an operation corresponding to a touch operation.

Furthermore, the processing unit 142 executes a touch operation based on the touch history information saved by the saving unit 141.

This enables the information processing apparatus 100 to execute the macro function for executing an operation corresponding to a touch operation.

Furthermore, when receiving designation of the execution date and time when the operation corresponding to a touch operation is to be executed, the processing unit 142 executes the touch operation at the designated date and time.

This enables the information processing apparatus 100 to preliminarily set a macro function for executing an operation corresponding to a touch operation and execute the macro function at the set time.

5. Hardware Configuration

Figure 14:
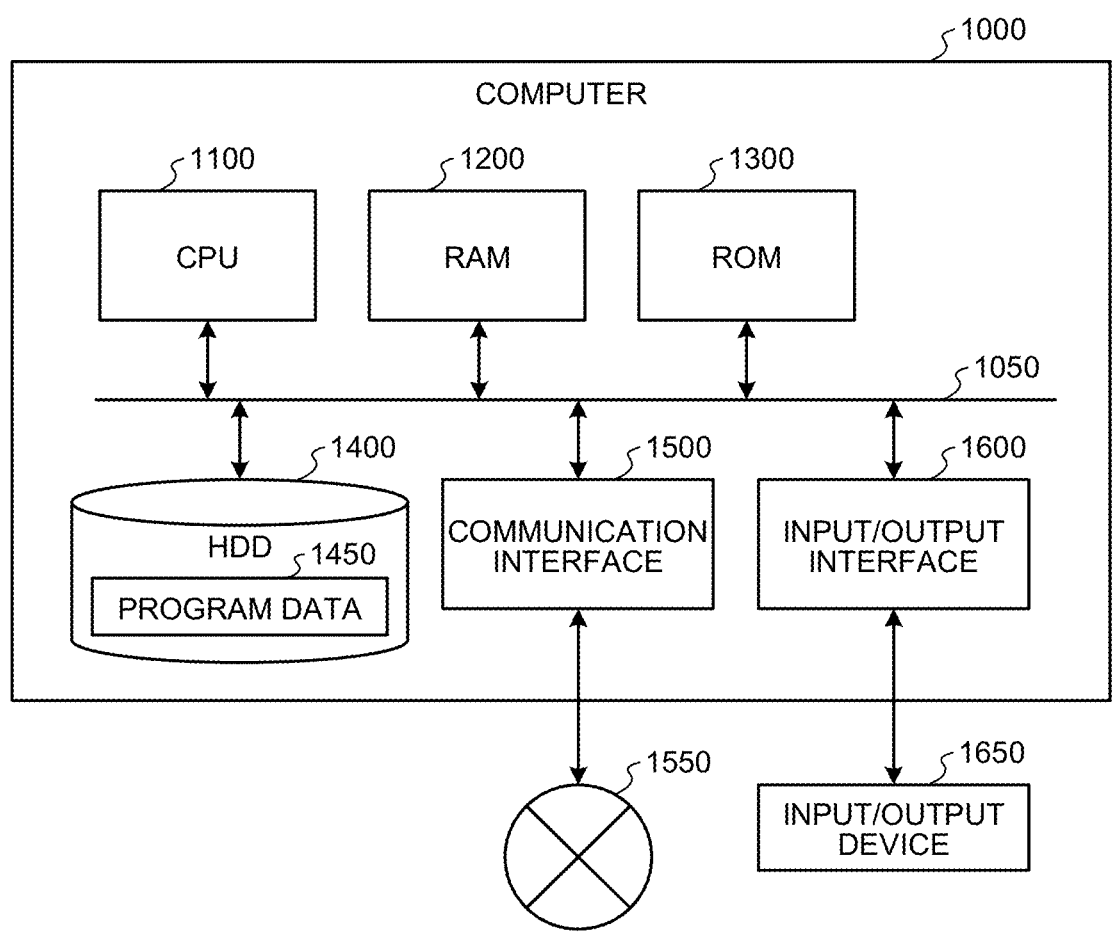
FIG. 14 is a hardware configuration diagram illustrating one example of a computer that implements the function of an information processing apparatus.

An information device such as the information processing apparatus 100 according to the above-described embodiment is reproduced by a computer 1000 having a configuration as illustrated in FIG. 14, for example. FIG. 14 is a hardware configuration diagram illustrating one example of the computer 1000 that reproduces the function of an information processing apparatus such as the information processing apparatus 100. An example of the information processing apparatus 100 according to the embodiment will be described below. The computer 1000 includes a CPU 1100, a RAM 1200, a read only memory (ROM) 1300, a hard disk drive (HDD) 1400, a communication interface 1500, and an input/output interface 1600. Units of the computer 1000 are connected by a bus 1050.

The CPU 1100 operates based on programs stored in the ROM 1300 or the HDD 1400, and controls each of the units. For example, the CPU 1100 develops the programs stored in the ROM 1300 or the HDD 1400 on the RAM 1200, and executes processing in accordance with the various programs.

The ROM 1300 stores a boot program such as a basic input output system (BIOS) executed by the CPU 1100 at the time when the computer 1000 is started, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records a program according to the present disclosure. The program is one example of program data 1450.

The communication interface 1500 connects the computer 1000 with an external network 1550 (e.g., Internet). For example, the CPU 1100 receives data from another device, and transmits data generated by the CPU 1100 to the other device via the communication interface 1500.

The input/output interface 1600 connects an input/output device 1650 with the computer 1000. For example, the CPU 1100 receives data from an input device such as a keyboard and a mouse via the input/output interface 1600. Furthermore, the CPU 1100 transmits data to an output device such as a display, a speaker, and a printer via the input/output interface 1600. Furthermore, the input/output interface 1600 may function as a medium interface that reads a program and the like recorded in a predetermined recording medium. The medium includes, for example, an optical recording medium such as a digital versatile disc (DVD) and a phase change rewritable disk (PD), a magneto-optical recording medium such as a magneto-optical disk (MO), a tape medium, a magnetic recording medium, and a semiconductor memory.

For example, when the computer 1000 functions as the information processing apparatus 100 according to the embodiment, the CPU 1100 of the computer 1000 reproduces the functions of the control unit 140 and the like by executing a program loaded on the RAM 1200. Furthermore, the HDD 1400 stores a program according to the present disclosure and various pieces of data. Note that the CPU 1100 reads the program data 1450 from the HDD 1400 and executes the program data 1450. In another example, the CPU 1100 may acquire these programs from another device via the external network 1550.

Furthermore, the effects described in the present specification are merely illustrative or exemplary ones, and are not limitations. That is, the technology according to the present disclosure can exhibit other effects obvious to those skilled in the art from the description of the present specification together with or instead of the above-described effects.

Note that the present technology can also have the configurations as follows.

(1)

An information processing apparatus comprising:
 a saving unit that saves touch history information indicating a history of a touch operation performed by an operation body that performs the touch operation to a screen; and
 a processing unit that executes processing based on the touch history information saved by the saving unit.

(2)

The information processing apparatus according to (1), wherein
 the processing unit determines a type of the touch operation based on the touch history information saved by the saving unit, and displays touch information indicating that the operation body has touched the screen in a different display mode in accordance with the type of the touch operation which has been determined.

(3)

The information processing apparatus according to (2), wherein
 the saving unit saves, as the touch history information, position information indicating a touch position where the operation body has touched the screen in time series, and
 the processing unit displays the touch information in time-series order at each position indicated by the position information based on the position information in time series saved by the saving unit.

(4)

The information processing apparatus according to (3), wherein
 the processing unit displays the touch information for a display time designated by a user.

(5)

The information processing apparatus according to (4), wherein
 the processing unit reduces visibility of the touch information as time in the display time proceeds.

(6)

The information processing apparatus according to any one of (2) to (5), wherein
 the saving unit saves, as the touch history information, time information indicating a touch time when the operation body has touched each position of the screen, and
 the processing unit displays the touch information in a different display mode in accordance with the time information saved by the saving unit.

(7)

The information processing apparatus according to any one of (2) to (6), wherein
 the saving unit saves, as the touch history information, number-of-times information indicating a number of times of touches in which the operation body has touched each position of the screen, and
 the processing unit displays the touch information in a different display mode in accordance with the number-of-times information saved by the saving unit.

(8)

The information processing apparatus according to any one of (2) to (7), wherein
 the saving unit saves, as the touch history information, pressure information indicating a touch pressure at a time when the operation body has touched each position of the screen, and
 the processing unit displays the touch information in a different display mode in accordance with the pressure information saved by the saving unit.

(9)

The information processing apparatus according to any one of (1) to (8), wherein
 the saving unit saves the touch history information within a period from a start point of time designated by a user to an end point of time designated by the user.

(10)

The information processing apparatus according to any one of (1) to (9), wherein
 the processing unit executes the touch operation based on the touch history information saved by the saving unit.

(11)

The information processing apparatus according to (10), wherein
 when receiving designation of reproduction date and time when an operation corresponding to the touch operation is to be reproduced, the processing unit executes the touch operation at the date and time that have been designated.

(12)

An information processing method comprising:
saving touch history information indicating a history of a touch operation performed by an operation body that performs the touch operation to a screen; and
executing processing based on the touch history information that has been saved.

(13)

An information processing program causing a computer to function to:
save touch history information indicating a history of a touch operation performed by an operation body that performs the touch operation to a screen; and
execute processing based on the touch history information that has been saved.

REFERENCE SIGNS LIST

100 INFORMATION PROCESSING APPARATUS
110 COMMUNICATION UNIT
120 STORAGE UNIT
130 INPUT/OUTPUT UNIT
140 CONTROL UNIT
141 SAVING UNIT
142 PROCESSING UNIT

The invention claimed is:

1. An information processing apparatus, comprising:
a central processing unit (CPU) configured to:
save touch history information indicating a history of a touch operation performed by an operation body, wherein
the operation body performs the touch operation on a screen;
determine a type of the touch operation from a plurality of types of touch operations, based on the saved touch history information, wherein
the plurality of types of touch operations includes a long press operation, a double tap operation, a repeated tap operation, a swipe operation, and a shot press operation; and
display touch information, indicating the touch operation, in a different display mode based on the determined type of the touch operation.

2. The information processing apparatus according to claim 1, wherein the CPU is further configured to:
save, as the touch history information, position information indicating a touch position where the operation body has touched the screen in time series, and
display, in a time-series order, the touch information at each position indicated by the saved position information.

3. The information processing apparatus according to claim 2, wherein the CPU is further configured to:
display the touch information for a display time designated by a user input.

4. The information processing apparatus according to claim 3, wherein the CPU is further configured to reduce visibility of the touch information as time in the display time proceeds.

5. The information processing apparatus according to claim 1, wherein the CPU is further configured to:
save, as the touch history information, time information indicating a touch time at which the operation body has touched each position of a plurality of positions of the screen; and
display the touch information based on the saved time information.

6. The information processing apparatus according to claim 1, wherein the CPU is further configured to:
save, as the touch history information, number-of-times information indicating a number of times of touches in which the operation body has touched each position of a plurality of positions of the screen; and
display the touch information based on the saved number-of-times information.

7. The information processing apparatus according to claim 1, wherein the CPU is further configured to:
save, as the touch history information, pressure information indicating a touch pressure at a time at which the operation body has touched each position of a plurality of positions of the screen; and
display the touch information based on the saved pressure information.

8. The information processing apparatus according to claim 1, wherein the CPU is further configured to save the touch history information within a period from a start point of time designated by a user input to an end point of the time designated by the user input.

9. The information processing apparatus according to claim 1, wherein the CPU is further configured to execute the touch operation based on the saved touch history information.

10. The information processing apparatus according to claim 9, wherein the CPU is further configured to:
receive a designation of reproduction date and a designation of a reproduction time, wherein an operation corresponding to the touch operation is reproduced at the designated date and the designated time; and
execute the touch operation at the designated date and the designated time.

11. An information processing method, comprising:
saving touch history information indicating a history of a touch operation performed by an operation body, wherein
the operation body performs the touch operation on a screen;
determining a type of the touch operation from a plurality of types of touch operations, based on the saved touch history information, wherein
the plurality of types of touch operations includes a long press operation, a double tap operation, a repeated tap operation, a swipe operation, and a shot press operation; and
displaying touch information, indicating the touch operation, in a different display mode based on the determined type of the touch operation.

12. A non-transitory computer-readable medium having stored thereon, computer-executable instructions which, when executed by a computer, cause the computer to execute operations, the operations comprising:
saving touch history information indicating a history of a touch operation performed by an operation body, wherein
the operation body performs the touch operation on a screen;
determining a type of the touch operation from a plurality of types of touch operations, based on the saved touch history information, wherein
the plurality of types of touch operations includes a long press operation, a double tap operation, a repeated tap operation, a swipe operation, and a shot press operation; and displaying touch information, indicating the touch operation, in a different display mode based on the determined type of the touch operation.

* * * * *